United States Patent
Jensen et al.

(10) Patent No.: US 10,754,362 B1
(45) Date of Patent: Aug. 25, 2020

(54) ADJUSTMENT OF LOOP-POWERED PNEUMATIC PROCESS CONTROL DEVICE INTERFACES

(71) Applicant: FISHER CONTROLS INTERNATIONAL LLC, Marshalltown, IA (US)

(72) Inventors: Kurtis K. Jensen, Marshalltown, IA (US); Tom Koch, Marshalltown, IA (US); Benjamin Koch, Marshalltown, IA (US); Davin Nicholas, Bondurant, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 0 days.

(21) Appl. No.: 16/280,532

(22) Filed: Feb. 20, 2019

(51) Int. Cl.
G05D 16/18 (2006.01)
G06F 9/30 (2018.01)
G05B 13/02 (2006.01)

(52) U.S. Cl.
CPC ......... G05D 16/185 (2013.01); G05B 13/024 (2013.01); G06F 9/3004 (2013.01)

(58) Field of Classification Search
CPC .................. A61B 18/1233; A61B 15/1445
See application file for complete search history.

(56) References Cited

U.S. PATENT DOCUMENTS

| | | | |
|---|---|---|---|
| 3,555,252 A * | 1/1971 | Garden | G05B 13/0265 700/47 |
| 3,952,954 A | 4/1976 | Taylor | |
| 6,088,187 A * | 7/2000 | Takaishi | G11B 5/5552 360/78.05 |
| 6,370,448 B1 * | 4/2002 | Eryurek | G05B 19/0421 700/19 |
| 6,871,128 B2 * | 3/2005 | Kouno | F16H 61/6648 192/3.51 |
| 7,021,072 B2 * | 4/2006 | McMillan | F24F 13/1426 361/152 |
| 7,050,259 B1 * | 5/2006 | Guo | G11B 5/59633 360/75 |
| 2004/0090892 A1 * | 5/2004 | Kadlec | G11B 7/08576 369/53.15 |

(Continued)

OTHER PUBLICATIONS

United States Patent and Trademark Office, "Non-Final Office Action," issued in connection with U.S. Appl. No. 16/280,522, dated Mar. 6, 2020, 31 pages.

*Primary Examiner* — Kidest Bahta
(74) *Attorney, Agent, or Firm* — Hanley, Flight & Zimmerman, LLC (57) ABSTRACT

Adjustment of loop-powered pneumatic process control device interfaces is disclosed. A disclosed example interface for use with a pneumatic process control device includes a power input to scavenge power from a loop power control signal associated with the process control system, a movement controller to cause movement of an actuator powered by the loop power, where the actuator is operatively coupled to a movable control input associated with the process control device, and a calibrator to read position feedback of the actuator during the movement to calculate a positional error, where the calibrator is to adjust a set point of the loop power control signal based on the positional error to control the actuator.

18 Claims, 7 Drawing Sheets

(56) References Cited

U.S. PATENT DOCUMENTS

| | | | |
|---|---|---|---|
| 2005/0201472 A1* | 9/2005 | Loechner | G08C 19/02 375/257 |
| 2006/0037467 A1* | 2/2006 | McCarroll | F15B 9/09 91/361 |
| 2008/0078449 A1* | 4/2008 | Pesek | F15B 13/0426 137/85 |
| 2009/0192653 A1 | 7/2009 | Songukrishnasamy et al. | |
| 2010/0163765 A1* | 7/2010 | Gregoire | F16K 31/1221 251/62 |
| 2015/0226177 A1 | 8/2015 | DeFrank et al. | |
| 2016/0025765 A1 | 1/2016 | Panther et al. | |
| 2018/0212648 A1* | 7/2018 | Haynes | H04B 3/548 |

* cited by examiner

ADJUSTMENT OF LOOP-POWERED PNEUMATIC PROCESS CONTROL DEVICE INTERFACES

FIELD OF THE DISCLOSURE

This disclosure relates generally to process control systems and, more particularly, to adjustment of loop-powered pneumatic process control device interfaces.

BACKGROUND

Many known process control systems employ pneumatic devices, such as a pneumatic controller, to control process control devices (e.g., valves, regulators, flow directors, etc.). Intermediate transducers are often employed in these systems to receive electrical signals (e.g., electrical signals that indicate a set point change) and convert the electrical signals to a pneumatic signal to be forwarded to a pneumatic controller which, in turn, causes movement of a process control device. However, these systems can be subject to reduced accuracy, as well as relatively high cost and complexity.

In some known process control systems, external power sources with relatively high voltages (e.g., above 110 VAC) are employed to power a motor or other electromechanical actuator to make set point adjustments to a pneumatic controller input. However, implementation of these power sources often requires relatively high costs and complexity while preventing a site/location from meeting certifications related to explosions or fire propagation.

SUMMARY

An example interface for use with a pneumatic process control device includes a power input to scavenge power from a loop power control signal associated with the process control system, a movement controller to cause movement of an actuator powered by the loop power, where the actuator is operatively coupled to a movable control input associated with the process control device, and a calibrator to read position feedback of the actuator during the movement to calculate a positional error, where the calibrator is to adjust a set point of the loop power control signal based on the positional error to control the actuator.

An example method to calibrate an interface for use with a pneumatic process control device of a process control system includes scavenging power from a loop power control signal, causing an actuator to move, where the actuator is operatively coupled to a movable control input associated with the process control device, and where the actuator is powered by the loop power control signal, and measuring position feedback of the actuator during the movement. The method also includes calculating, via instructions executed by a processor, a positional error of the actuator based on the position feedback, and adjusting, via instructions executed by the processor, a set point of the loop power control signal based on the positional error to control the actuator.

An example tangible machine readable medium includes instructions, which when executed, cause a processor to at least cause a power input to scavenge power from a loop power control signal associated with a process control system, and cause an actuator to move, where the actuator is operatively coupled to a movable control input associated with a pneumatic process control device of the process control system, and where the actuator powered by the loop power control signal. The instructions further cause the processor to calculate a positional error of the actuator based on position feedback measured during the movement, and adjust a set point of the loop power control signal based on the positional error to control the actuator.

The figures are not to scale. In general, the same reference numbers will be used throughout the drawing(s) and accompanying written description to refer to the same or like parts. As used in this patent, stating that any part is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Adjustment of loop-powered pneumatic process control device interfaces is disclosed. Some known process-control systems employ intermediate transducers to convert electrical signals (e.g., electrical set point signals) to a pneumatic signal to be sent to a pneumatic controller. However, the accumulation of errors across different signaling devices, as well as signal conversion processes, can significantly reduce accuracy in such systems.

Some known systems employ externally powered devices at a relatively high voltage (e.g., 110 VAC, 24 VDC, etc.) to convert signals and cause movement of a pneumatic controller. However, such known systems exhibit relatively high power consumption and can involve significant cost and complexity. Further, these known systems can increase difficulty in achieving hazardous area certifications due to the relatively high voltage and/or currents needed to power these externally powered devices.

Examples disclosed herein enable accurate adjustment and/or calibration of cost-effective and energy-efficient interfaces that control pneumatic process control system devices. Examples disclosed herein employ a calibrator to calibrate a device interface (e.g., an interface, a pneumatic controller interface) that works in conjunction with a relatively low power actuator to cause movement of a set point input of a pneumatic controller. Accordingly, examples disclosed herein enable accurate control of corresponding pneumatic process control device(s).

As used herein, the terms "loop power" and "loop power control signal" refer to a current loop signal (e.g., 4-20 milliamps) associated with process control devices of a process control system (e.g., refineries, factories, industrial applications, etc.). As used herein, the term "scavenge" refers to extracting electrical energy and/or power from a relatively low voltage and/or current signal (e.g., a control signal to control process control devices). As used herein, the term "actuator" refers to any electrically-powered device that affects movement of an object and includes, but is not limited to, a motor, a solenoid, an electromagnetic device, a motor with a gear drive, etc. Accordingly, the term "actuator" can refer to a device that causes linear motion, translational motion, angular motion and/or rotational motion. As used herein, the term "position feedback" refers to measurements and/or readings (e.g., numerical ticks, measured displacement, etc.) associated with quantifying movement, which can be translational and/or rotational.

Figure 1:
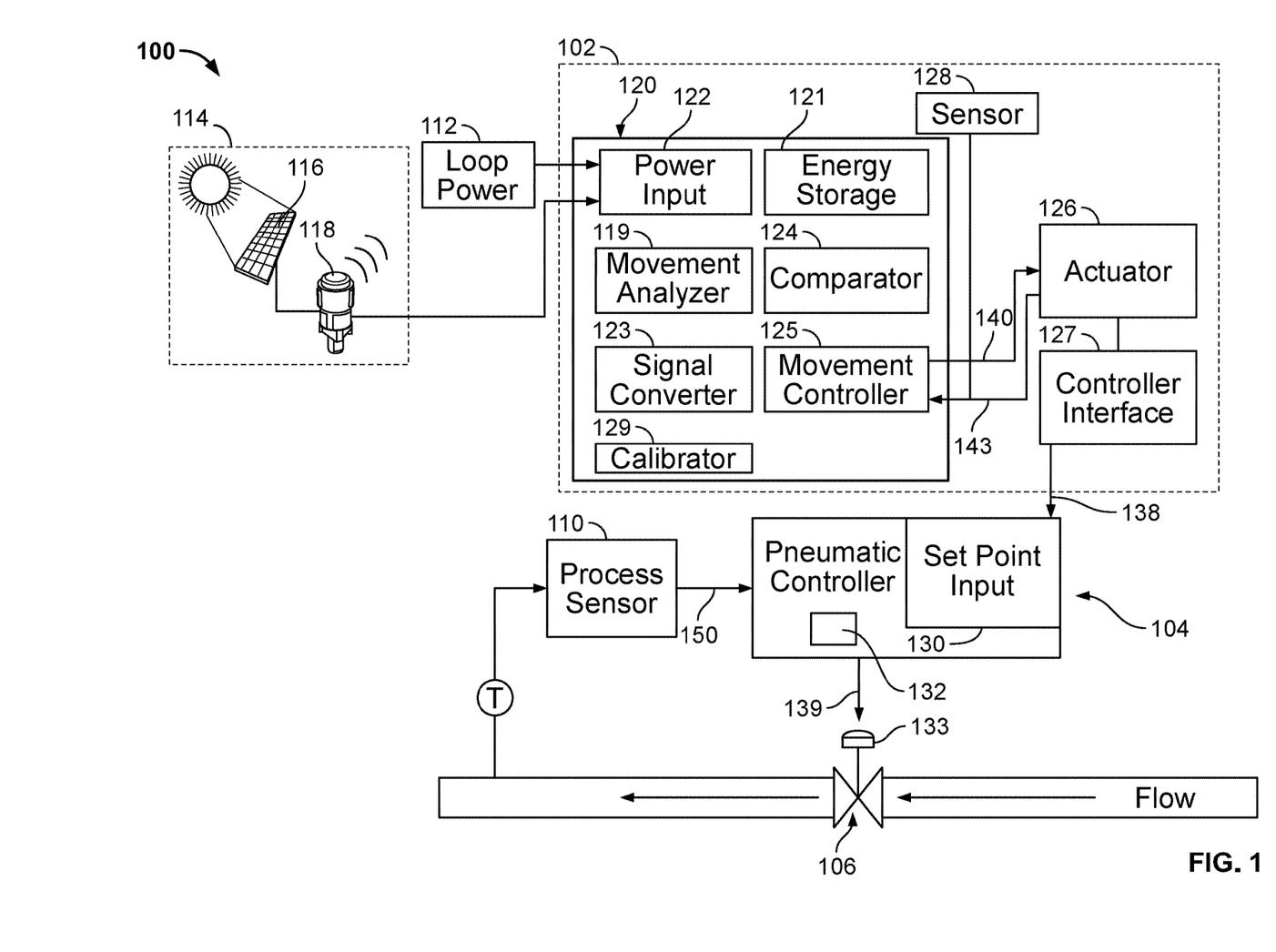
FIG. 1 is a schematic overview of a pneumatic device control system in accordance with teachings of this disclosure.

FIG. 1 is a schematic overview of an example pneumatic device control system 100 in accordance with teachings of this disclosure. The pneumatic device control system 100 of the illustrated example includes an example pneumatic control interface (e.g., an interface, a device interface) 102, and a pneumatic controller 104 that is operatively coupled to a process control device (e.g., a control valve) 106. The example pneumatic device control system 100 also includes a process sensor 110, and a loop power control signal 112. In some other examples, the pneumatic device control system 100 includes a power/signal harvester 114, which includes a solar panel (e.g., a radiant light energy harvester, a solar array, etc.) 116 and a signal transceiver (e.g., a wireless signal transceiver, a wireless module) 118, which is communicatively coupled to a network and/or remote process control system (e.g., a remote process control system).

According to the illustrated example, the pneumatic control interface 102 includes a control circuit 120, which includes a movement analyzer 119, an energy storage 121, a power input 122, a signal converter 123, a comparator 124, a movement controller 125, and a calibrator 129. Further, the example pneumatic control interface 102 also includes an actuator 126, which is implemented as an electrically-powered motor in this example, a controller interface (e.g., a mechanical controller interface) 127 and a sensor (e.g., a positional sensor) 128.

The example pneumatic controller 104 includes a movable set point input (e.g., a movable input, a movable control input, an input lever, an input switch, etc.) 130 and a pneumatic amplifier 132. In particular, the movable set point input 130 is moved (e.g., rotated clockwise and/or counterclockwise) to control the output of the pneumatic amplifier 132, which provides a pneumatic output signal 139 to a pneumatic actuator 133 associated with the process control device 106.

According to the illustrated example, the power input 122 scavenges power from the relatively low power loop power control signal 112. In particular, the power input 122 scavenges power from the loop power control signal 112 and provides the scavenged power to the actuator 126. Accordingly, using the scavenged power, the actuator 126 is operated to move the movable set point input 130 of the pneumatic controller 104. In this example, the loop power control signal 112 is less than 50 milliamps (mA) of current (e.g., 4-20 mA, 10-50 mA, etc.). In some examples, some or all of the scavenged power is stored in the aforementioned energy storage 121, which may be implemented as a battery or other energy storage device (e.g., one or more capacitors).

Figure 2A:
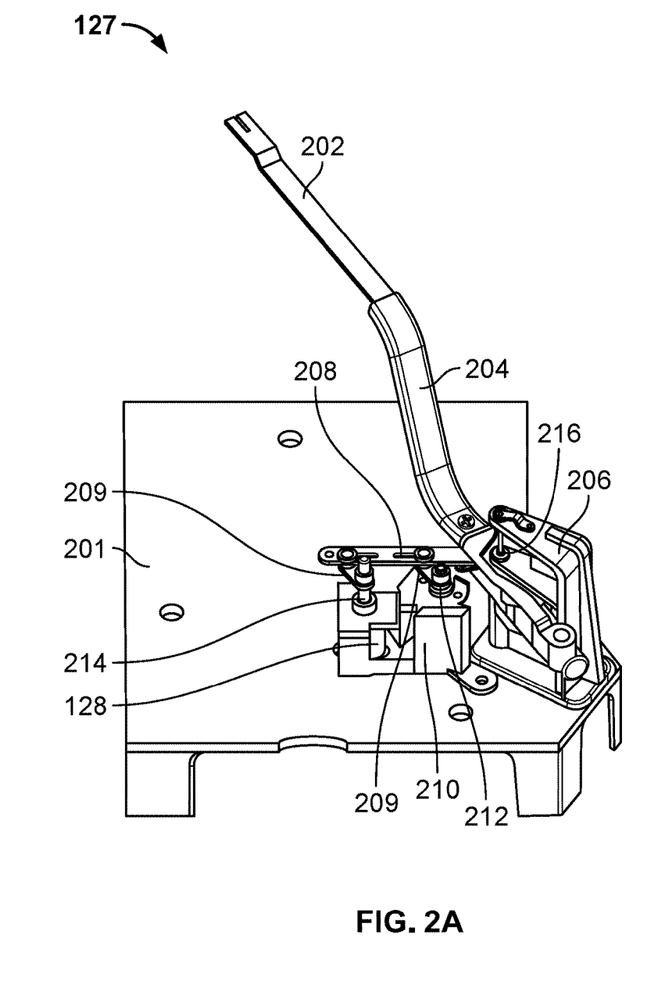
FIGS. 2A and 2B depict an example pneumatic controller interface that can be implemented in examples disclosed herein.
Figure 2B:
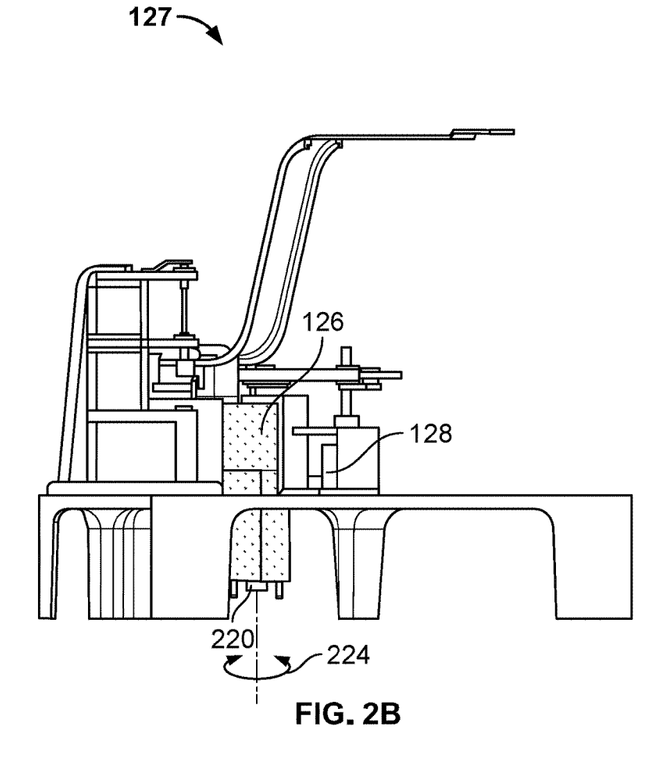

To determine a position of the actuator 126 and/or the movable set point input 130, the movement analyzer 119 of the illustrated example receives sensor data from the sensor 128 and determines a position of the actuator 126, a movable portion, such as an interfacing portion 220 of the actuator 126 shown in FIG. 2B, and/or the movable set point input 130. In some examples, the movement analyzer 119 determines an angular displacement and/or rotational angle associated with the actuator 126 and/or the movable set point input 130.

According to the illustrated example, the comparator 124 compares the determined position of the actuator 126 and/or the movable set point input 130 from the movement analyzer 119 with a desired position. In this example, the desired position is based on a set point encoded within the loop power control signal 112 (e.g., the set point is converted/decoded by the signal converter 123). Additionally or alternatively, the desired position is at least partially based on a signal from the process sensor 110. As a result, the comparison between the determined and desired positions is used to direct movement and/or adjustment of the actuator 126 to vary the movable set point input 130.

To direct movement of the actuator 126 and, in turn, the movable set point input 130, as generally shown by an arrow 138, the control circuit 120 and/or the movement controller 125 transmits a control signal to the actuator 126, as generally indicated by an arrow 140. Accordingly, the actuator 126 actuates the controller interface 127 and the movable set point input 130 which, in turn, controls the pneumatic controller 104 along with the process control device 106. As a result, movement of the actuator 126 and, thus, the movable set point input 130 is accomplished without external power having a relatively high voltage (i.e., a power source other than that of the loop control signal 112) or pneumatic devices in this example. In other examples, the actuator 126 can cause translational, rather than rotational, movement of the movable set point 130.

To control a position and/or degree of movement of the actuator 126, a positional measurement associated with the actuator 126 is provided to the movement controller 125 from the sensor 128, as generally indicated by an arrow 143. According to the illustrated example, based on the loop power control signal 112 (e.g., signals encoded in the loop power control signal 112), the signal converter 123 converts and/or determines a desired position of the actuator 126 and/or the movable set point input 130 (e.g., a 4 mA signal represents a fully closed position of the process control device 106 while a 20 mA signal represents a fully open position of the process control device 106). Further, the comparator 124 determines a degree to which a current position of the actuator 126, a movable portion of the actuator 126 and/or the movable set point input 130 is different from the desired position. In other words, the comparator 124 determines a deviation between the current position and the desired position. In this example, measurements from the position sensor 128 are used to determine the current position. However, in other examples, measurements from the actuator 126 are used to determine the current position (e.g., without the sensor 128). Based on the comparison performed by the comparator 124, the control circuit 120 directs movement of the actuator 126 to bring the actuator 126 (e.g., a movable portion of the actuator 126) and/or the movable set point input 130 within a tolerance range (e.g., a tolerance error range of less than 5%) of its respective desired position. In some examples, the movement of the actuator 126 and/or the tolerance range is user configurable.

According to the illustrated example, when the power input 122 ceases to receive loop power from the loop power control signal 112, the actuator 126 ceases movement and/or is held in its last position. In other words, the actuator 126 is able to maintain a current set point (e.g. a lock-in-last value, a fail-in-fast value, a maintain-last value, etc.) during a no-power condition, such as a power outage or loop power failure. In some other examples, the loop power control signal 112 and/or energy stored in the energy storage 121 is used to maintain the current set point when other power sources (e.g., higher voltage/current sources, a source of the loop power control signal 112) have ceased providing power (e.g., a process control system power outage).

In this example, the movement controller 125 directs movement of the actuator 126 based on the desired position from the movement analyzer 119 and/or the comparator 124. In some other examples, however, the movement controller 125 directs the movement of the actuator 126 further based on signals from the process sensor 110.

The calibrator 129 of the illustrated example adjusts movement parameters associated with the movement analyzer 119 and/or the movement controller 125 to calibrate movement of the actuator 126 and/or the controller interface 127 and, thus, the movable set point input 130, thereby enabling more accurate control of the process control device 106. In this example, the calibrator 129 is implemented to ensure that the movement controller 125 moves the actuator 126 within a requisite degree of accuracy (e.g., within a tolerance zone, etc.). In some examples, the calibrator 129 adjusts a set point encoded within the loop power control signal 112 so that the actuator 126 operates with the requisite accuracy. Additionally or alternatively, in some examples, the set point input 130 adjusted (e.g., manually adjusted) during a calibration process.

In some examples, the example power input 122 directs storage of energy from the loop power control signal 112 into the energy storage 121. In some such examples, the stored energy can be used to maintain the actuator 126 in a stationary position (e.g., a locked position, a locked rotation, etc.), as opposed to the actuator 126 mechanically locking, for example, when the loop power control signal 112 is no longer provided. In some examples, the movement controller 125 enables a manual override setting that allows a user or operator to manually move the movable set point input 130 while preventing the actuator 126 from locking.

In some examples, the desired position associated with the actuator 126 is determined at least partially based on sensor data from the process sensor 110. In some such examples, the process sensor 110 provides measurement data to the pneumatic controller 104, as generally indicated by an arrow 150, so that the pneumatic controller 104 can verify that the process control device 106 is operating within expected or desired parameters.

In some examples, the actuator 126 is implemented as a stepper motor, a low-voltage DC motor, etc. In some such examples, the actuator 126 has an associated gear drive. In some examples, the sensor 128 is implemented as potentiometer. Additionally or alternatively, the sensor 128 is implemented as a magnetic field sensor, a hall effect sensor and/or an imaging sensor. However, any appropriate positional and/or rotation measuring device can be implemented instead.

In some other examples, the power scavenged by the power input 122 is generated from harvesting radiant light energy (e.g., solar energy) via the solar panel 116. In such examples, the signal transceiver 118 receives wireless signals (e.g., Wi-Fi signals, Highway Addressable Remote Transducer (HART) protocol, Bluetooth, etc.) associated with a process control system (e.g., a process control input signal), encodes the wireless signal as a loop power control signal and forwards the loop power control signal to the power input 122. In other words, the example signal transceiver 118 can combine relatively low voltage power harvested from the solar panel 116 with the received wireless signals to define the loop power control signal to be forwarded to the power input 122.

FIGS. 2A and 2B depict the example pneumatic controller interface 127 that can be implemented in examples disclosed herein. In this example, the pneumatic controller interface 127 is implemented to convey movement (e.g., translation and/or rotational movement, mechanical movement, etc.) from the pneumatic control interface 102 to the pneumatic controller 104, both of which are described above in connection with FIG. 1.

Turning to FIG. 2A, the pneumatic controller interface 127 includes a mounting plate 201, a set point indicator (e.g., a visual set point indicator) 202, a set point indicator arm 204, a first mounting bracket 206, a movement arm (e.g., a movement translator, a movement linkage, a four-bar linkage, a joining linkage, a rotatable coupling arm, etc.) 208, movement linkages 209 and a second mounting bracket 210. In this example, the second mounting bracket 210 defines first and second pivots 212, 214 while the first mounting bracket 206 defines a third pivot 216.

As can be seen in FIG. 2A, the first mounting bracket 206 mounts and aligns the set point indicator 202. Further, the second mounting bracket 210 supports and aligns the sensor 128, which is implemented as a potentiometer in this example, as well as the actuator 126 (shown in FIG. 2B).

FIG. 2B is a side view of the example pneumatic controller interface 127 described above in connection with FIG. 2B. In this example, the actuator 126 is shown with the aforementioned interfacing portion (e.g., a moving portion, a rotatable interfacing portion, etc.) 220 that is to contact and engage the movable set point input 130 shown in FIG. 1 (e.g., rotate at least a portion of the movable set point input 130). In this example, motion of the movable set point input 130 is measured (e.g., measured directly or indirectly) by the sensor 128. In some examples, the interfacing portion 220 is coupled to the movable set point input 130 via a fastener (e.g., a mechanical fastener).

In operation, the control circuit 120 of FIG. 1 directs and controls movement of the actuator 126 and, in turn, the pneumatic controller interface 127 translates motion from the actuator 126 to the movable input set point 130. In particular, the first pivot 212 is defined by the actuator 126, the second pivot 214 is defined by the sensor 128, and the third pivot 216 is defined by the set point indicator 202. In other words, the movement arm 208 and the movement linkages 209 relate motion between the first, second and third pivots 212, 214, 216 of FIG. 2A, thereby coupling motion between the set point indicator 202, the actuator 126 and the sensor 128. In particular, a rotational movement of the actuator 126 at the first pivot 212 causes a rotational movement of the movement arm 208 and the interfacing portion 220, as generally indicated by a double arrow 224. As the movement arm 208 translates the second pivot 214, rotates to vary a signal detected by the sensor 128 and, in turn, the set point indicator 202 rotates about the third pivot 216 to indicate a setting corresponding to the process control device 106.

In some examples, the movement linkages 209 and/or the movement arm 208 can be adjusted to vary a relative degree of rotation between the first, second and third pivots 212, 214, 216. In particular, lengths of any of the movement arm 208 and/or the movement linkages 209 spanning between any one of the first, second and third pivots 212, 214, 216 can be adjusted. In other words, in such examples, the movement links 209 and/or the movement arm 208 include at least one length adjustable portion to vary relative rotational motion between the first, second and third pivots 212, 214, 216.

While an example manner of implementing the pneumatic device control system 100 of FIG. 1 is illustrated in FIG. 1, one or more of the elements, processes and/or devices illustrated in FIG. 1 may be combined, divided, re-arranged, omitted, eliminated and/or implemented in any other way. Further, the example movement analyzer 119, the example power input 122, the example signal converter 123, the example comparator 124, the example movement controller 125, the example calibrator 129 and/or, more generally, the example pneumatic device control system 100 of FIG. 1 may be implemented by hardware, software, firmware and/or any combination of hardware, software and/or firmware. Thus, for example, any of the example movement analyzer 119, the example power input 122, the example signal converter 123, the example comparator 124, the example movement controller 125, the example calibrator 129 and/or, more generally, the example pneumatic device control system 100 could be implemented by one or more analog or digital circuit(s), logic circuits, programmable processor(s), programmable controller(s), graphics processing unit(s) (GPU (s)), digital signal processor(s) (DSP(s)), application specific integrated circuit(s) (ASIC(s)), programmable logic device (s) (PLD(s)) and/or field programmable logic device(s) (FPLD(s)). When reading any of the apparatus or system claims of this patent to cover a purely software and/or firmware implementation, at least one of the example movement analyzer 119, the example power input 122, the example signal converter 123, the example comparator 124, the example movement controller 125 and/or the example calibrator 129 is/are hereby expressly defined to include a non-transitory computer readable storage device or storage disk such as a memory, a digital versatile disk (DVD), a compact disk (CD), a Blu-ray disk, etc. including the software and/or firmware. Further still, the example pneumatic device control system 100 of FIG. 1 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Flowcharts representative of example hardware logic, machine readable instructions, hardware implemented state machines, and/or any combination thereof for implementing the pneumatic device control system 100 of FIG. 1 are shown in FIGS. 3-6. The machine readable instructions may be one or more executable programs or portion(s) of an executable program for execution by a computer processor such as the processor 712 shown in the example processor platform 700 discussed below in connection with FIG. 7. The program may be embodied in software stored on a non-transitory computer readable storage medium such as a CD-ROM, a floppy disk, a hard drive, a DVD, a Blu-ray disk, or a memory associated with the processor 712, but the entire program and/or parts thereof could alternatively be executed by a device other than the processor 712 and/or embodied in firmware or dedicated hardware. Further, although the example program is described with reference to the flowcharts illustrated in FIGS. 3-6, many other methods of implementing the example pneumatic device control system 100 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, etc. in order to make them directly readable and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein. In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

As mentioned above, the example processes of FIGS. 3-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

Figure 3:
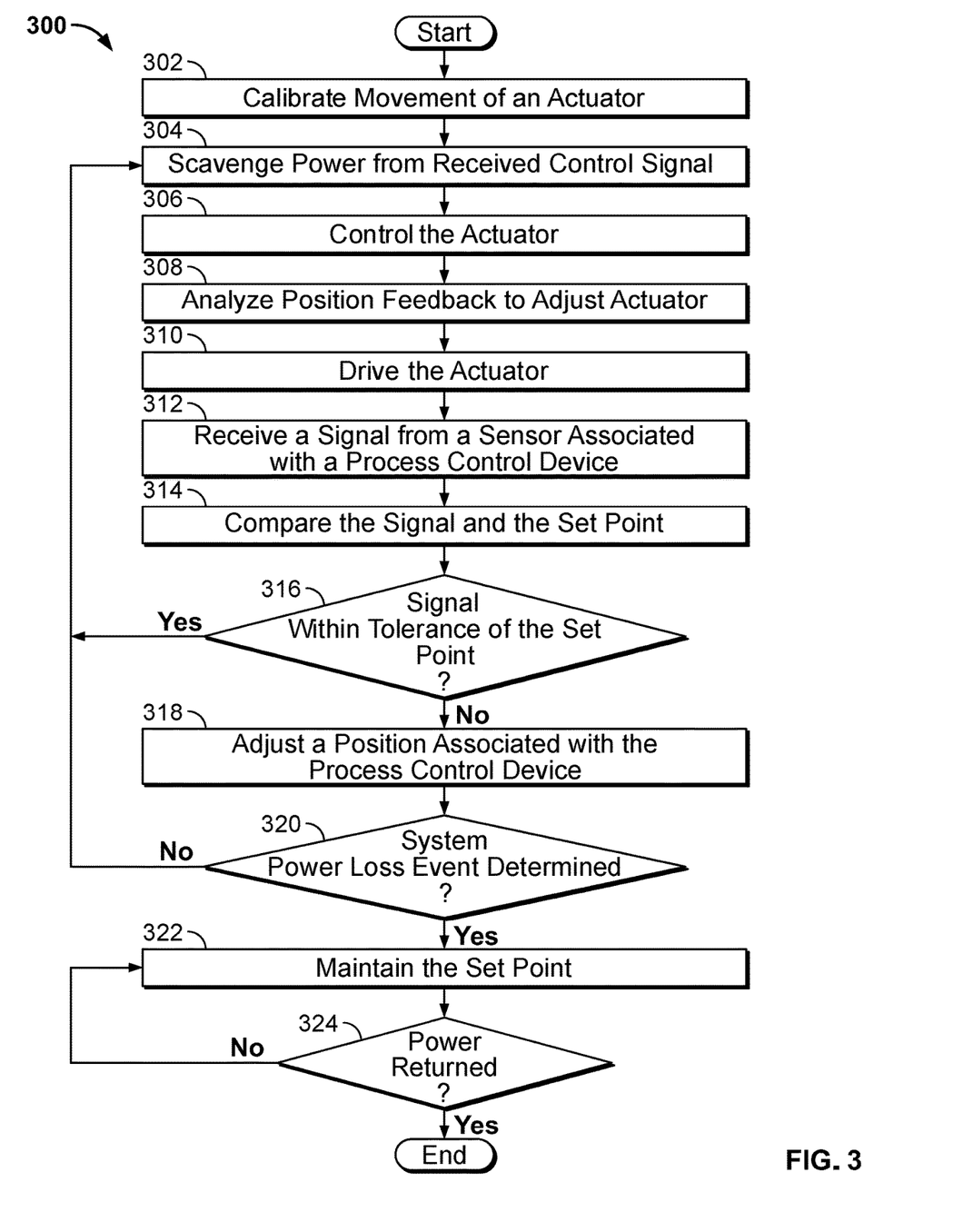
FIG. 3 is a flowchart representative of machine readable instructions which may be executed to implement examples disclosed herein.

The example method 300 begins as movement parameters associated with the actuator 126, the controller interface 127 and/or the movable input set point 130 are to be adjusted to operate the process control device 106 with a requisite degree of accuracy. In other words, the pneumatic control interface 102 is to be calibrated for accuracy. In this example, the pneumatic control interface 102 is calibrated in an automated process in which malfunctions can be identified (e.g., malfunctions associated with components of the pneumatic controller interface 127). In some examples, data from the process sensor 110 is used to verify that the process control device 106 is being operated with the aforementioned requisite degree of accuracy.

Figure 4:
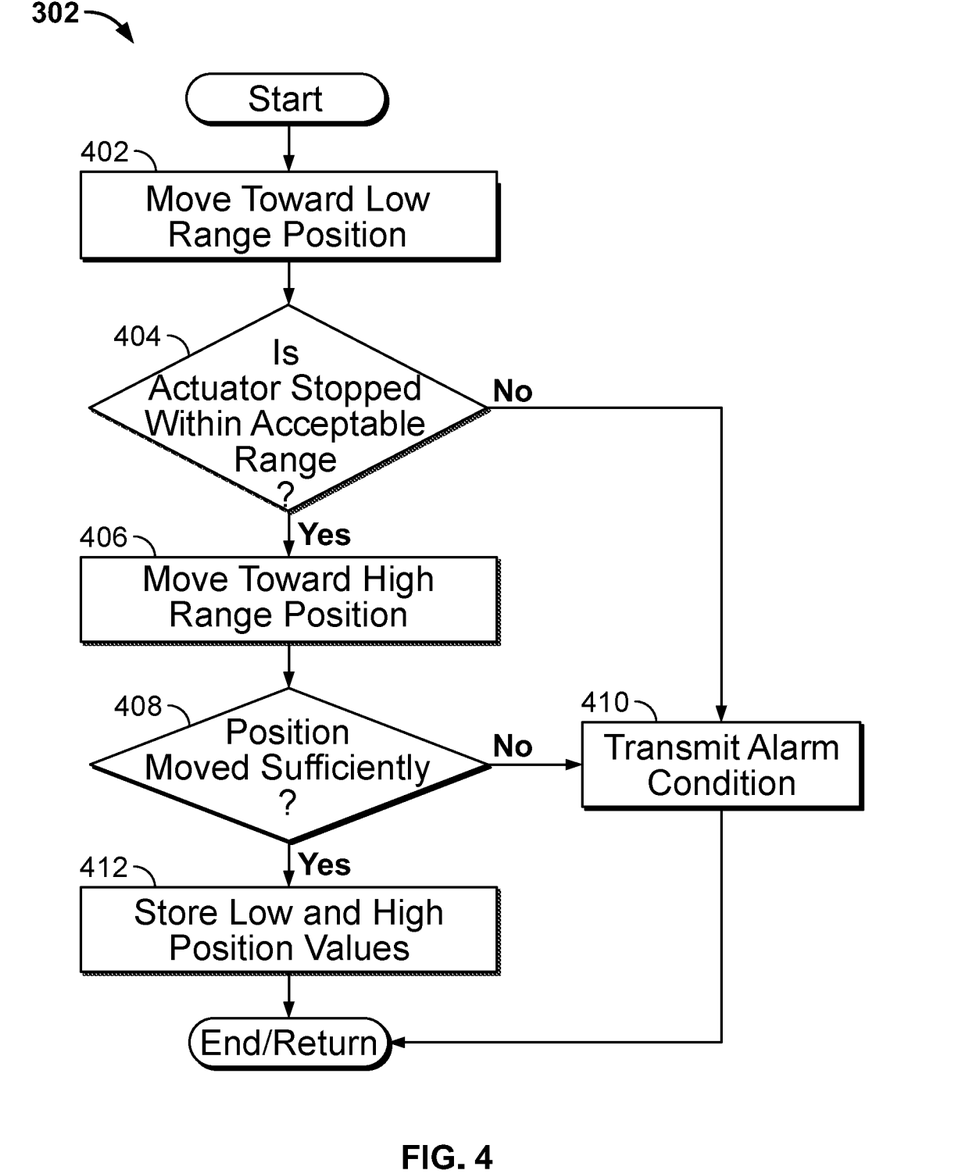
FIG. 4 is a flowchart representative of an example subroutine of the machine readable instructions of FIG. 3.

According to the illustrated example, at block 302, the calibrator 129 adjusts a movement and/or movement parameters of the actuator 126 during a calibration process of the example pneumatic control interface 102, as is discussed in greater detail blow in connection with FIG. 4.

At block 304, the example power input 122 scavenges power from the loop power control signal 112. In particular, the power input 122 harvests power from the loop power control signal 112, which ranges between 4 and 20 mA in this example. In other examples, the power input 122 receives the loop power control signal from the power/signal harvester 114.

At block 306, the control circuit 120 and/or the movement controller 125 controls the actuator 126 based on the loop power control signal 112. In this example, the actuator 126 is moved based on a set point encoded in the loop power control signal 112.

According to the illustrated example, at block 308, the calibrator 129 and/or the movement analyzer 119 analyzes position feedback to adjust movement of the actuator 126. For example, movement of the actuator 126 can be adjusted based on encountered errors in position, as described in greater detail below in connection with FIGS. 5 and 6. Additionally or alternatively, the position feedback is associated with the controller interface 127 or the movable set point input 130.

At block 310, the actuator 126 of the illustrated example is driven to move both the controller interface 127 and the movable set point input 130 based on the loop power control signal 112 (e.g., an un-adjusted loop-powered control signal 112). In other words, a process (e.g., a fluid flow process, etc.) of the process control device 106 is controlled by moving the movable input set point 130

At block 312, a signal from the example process sensor 110 is received by the calibrator 129 and/or the movement analyzer 119.

At block 314, according to the illustrated example, the comparator 124 compares the received signal and a set point (e.g., a desired set point, etc.) that is based on the loop power control signal 112 (e.g., an adjusted or un-adjusted set point derived from the loop power control signal 112). In this example, the comparator 124, the calibrator 129 and/or the movement analyzer 119 determine an error or deviation between the desired set point and the received signal. Additionally or alternatively, the calibrator 129 characterizes, relates and/or correlates a movement or position of the actuator 126 with signals measured by the process sensor 110 (e.g., the signals include sensor values associated with a process control system).

Next, it is determined whether the received signal is within a requisite tolerance (e.g., acceptable corresponding tolerance range(s), etc.) from the aforementioned set point (block 316). If the received signal is within the requisite tolerance (block 316), control of the process returns to block 304. Otherwise, the process proceeds to block 318.

At block 318, a position and/or movement associated with the process control device 106 is adjusted by the calibrator 129 to bring the received signal within the aforementioned requisite tolerance, for example. In particular, the movement controller 125 causes the actuator 126 to move the controller interface 127 and, in turn, the movable set point 130 along with the process control device 106.

At block 320, in some examples, it is then determined whether a system power loss event has occurred. For example, the system power loss can be associated with loss of the loop power control signal 112 or a power source (e.g., a high voltage or current power source, etc.) associated with the process control device 106 and/or the pneumatic controller 104. If the system power loss has not occurred (block 320), control of the process returns to block 304. Otherwise, the process proceeds to block 322.

According to the illustrated example, based on an occurrence of the system power loss event (block 320), the set point of the pneumatic controller 104 is maintained (block 322). For example, the actuator 126 maintains rotational movement of the controller interface 127 and, as a result, the movable set point input 130 is prevented from moving, thereby maintaining the process control device 106 at the last set point.

At block 324, it is determined whether the power has been restored. If the power has not been restored (block 324) control of the process returns to block 322. Otherwise, the process ends.

Turning to FIG. 4, a flowchart representative of the example subroutine 302 of the example method 300 of FIG. 3 is shown. According to the illustrated example, the subroutine 302 is to calibrate and/or adjust movement ranges of the actuator 126.

In this example, at block 402, the actuator 126 is moved toward a low range position and/or a low range setting (e.g., a low extreme position such as fully closed). In other words, the actuator 126 is moved to a 0% span position in this example. In some examples, the actuator 126 is moved to the low range position by withdrawing the actuator 126 from a system-controlled set point mode (e.g., the actuator 126 is placed into a manual control mode). Additionally or alternatively, the movable set point input 130 is, instead, moved to a respective low range position (e.g., a respective low extreme position).

According to the illustrated example, at block 404, the comparator 124 determines whether the actuator 126 has stopped within an acceptable range/tolerance of the low range position. If the actuator 126 has not moved or stopped within the acceptable range (block 404), control of process proceeds to block 410, where an alarm condition is transmitted to a process control network and/or system by the example movement analyzer 119 and/or the calibrator 129, and the process ends. Otherwise, control of the process proceeds to block 406. In some other examples, the determination of whether the actuator 126 has stopped within the acceptable range is based on data measured from the process control sensor 110 (e.g., a value measured at the process control sensor 110 must be below a threshold value). In some examples, if the actuator 126 is not moving sufficiently (e.g., not far enough), a malfunction type (e.g., a mechanical linkage failure, etc.) is determined by the calibrator 129 (e.g., based on a degree to which the actuator 126 is stuck, based on an angular range in which the actuator 126 is stuck, etc.).

At block 406, the actuator 126 of the illustrated example is moved to a high range position (e.g., a high extreme position such as fully open) of the actuator 126. In other words, the actuator 126 is moved to a 100% span position in this example.

At block 408, it is determined whether actuator 126 has moved sufficiently toward the high range position (e.g., sufficiently toward a maximum position of the actuator 126, the controller interface 127 or the movable set point input 130). In some other examples, the determination of whether the actuator 126 has moved sufficiently is based on data measured from the process control sensor 110 (e.g., a value measured at the process control sensor 110 must be above a threshold value). If the position of the actuator 126 has not moved sufficiently (block 408), control of the process proceeds to block 410, where an alarm condition is transmitted and the process ends. Otherwise, control of the process proceeds to block 412.

According to the illustrated example, at block 412, the movement analyzer 119 and/or the calibrator 129 store high and low position values or data points (e.g., the high and low position values are stored in the control circuit 120) associated with the low range and high range positions, respectively, to calibrate the movement of the actuator 126 and the process ends. In this example, the high and low position values are used to define calibrated set point ranges of the actuator 126. In other words, the stored values are positional measurements associated with the low range position and the high range position. In some examples, the stored high and low position values are at least partially analyzed in conjunction with corresponding output values measured by the process sensor 110. In some examples, the high and low position values are verified to be within acceptable respective ranges prior to being stored. In some examples, a date and time of calibration data is stored (e.g., via a local clock of the control circuit 120).

Figure 5:
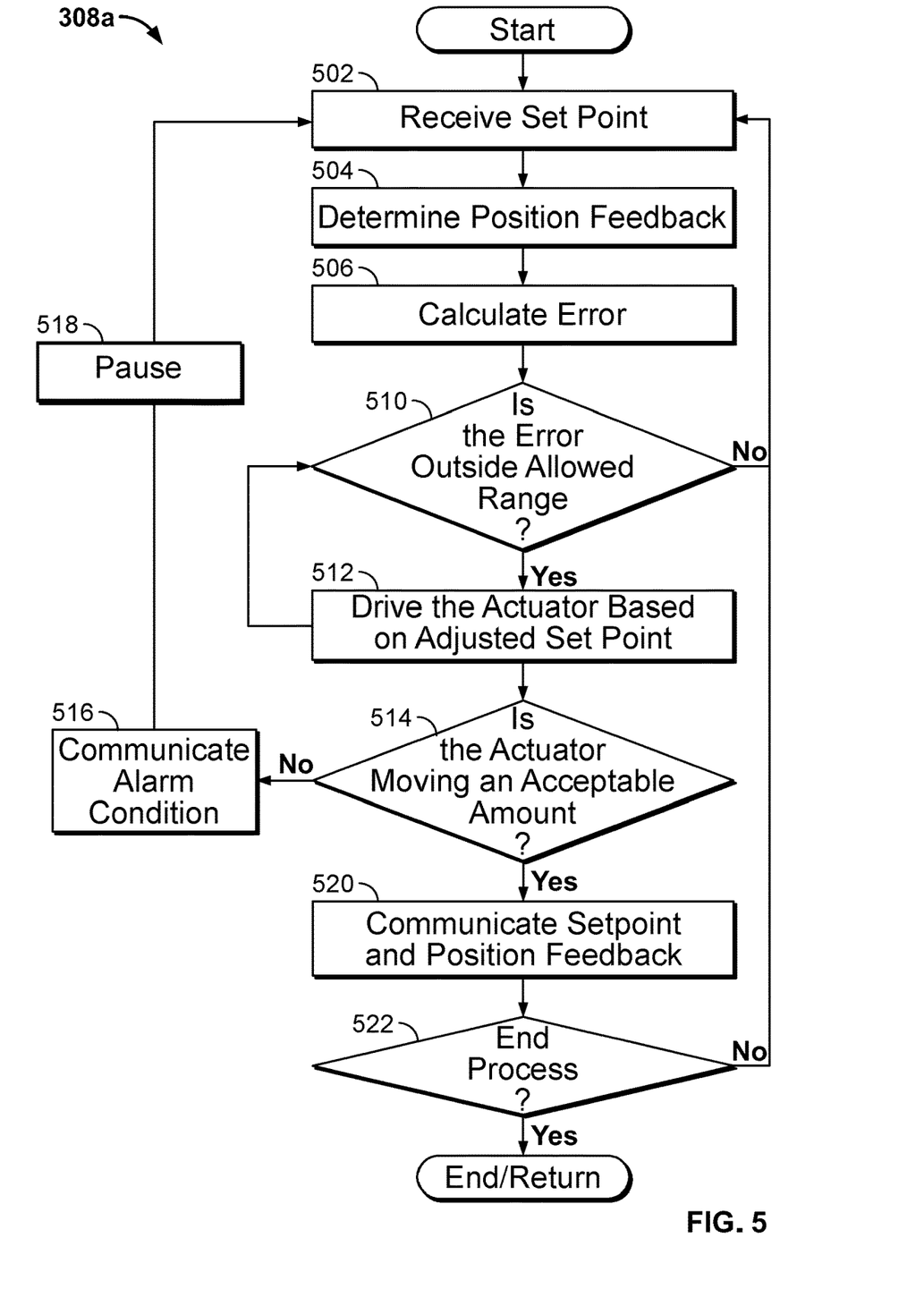
FIG. 5 is a flowchart representative of an example subroutine of the machine readable instructions of FIG. 3.

Turning to FIG. 5, a flowchart representative of an example subroutine 308a is shown. For example, the subroutine 308a can be used to implement the block 308 of FIG. 3.

At block 502, a set point from the loop power control signal 112 (e.g., encoded by the loop power control signal 112) is received by the power input 122, for example.

At block 504, the calibrator 129 and/or the movement analyzer 119 determine and/or read position feedback from the actuator 126. In other examples, the position feedback is associated with the controller interface 127 or the movable set point interface 130.

At block 506, an error (e.g., a positional error) between the position feedback and the set point is calculated by the calibrator 129.

At block 510, it is determined by the comparator 124 as to whether the calculated error is outside an allowed range (e.g., a tolerance band, etc.). If the calculated error is not outside of the allowed range (block 510), control of the process returns to block 502. Otherwise, the process proceeds to block 512.

At block 512, the actuator 126 is driven and/or operated based on an adjusted set point (e.g., an offset and/or scalar adjusted set point based on the high and low position values described above in connection with FIG. 4). In this particular example, input signals and internal measured positions associated with the high and low position values are recorded and when a change in set point is recognized, the calibrator 129 determines if a control action would require depending on an integral or control dead band, for example. Accordingly, the actuator 126 is controlled based on the adjusted set point calculated by the calibrator 129 to operate the actuator 126 within a desired error and/or a desired error range. In this example adjustment offsets are calculated based on internal positions/measurements of the actuator 126. In some examples, if there is a difference/offset between a set point and an actual motor position, then the output is modified or adjusted by the calibrator 129 to adjust for the difference/offset (e.g., adjusted to make the set point and the actual motor position match within a control dead band). In some examples where the difference/offset is due to ambient temperature, the mechanical linkages 208, 209 and/or the aforementioned position of the actuator 126 can be adjusted. In some such examples, as ambient temperature increases, components expand and the calibrator 129, accordingly, compensates by adjusting the output of the actuator 126 to reflect the actual position. For example, if output to the actuator 126 was 50% and resulted in a feedback of 50% at ambient room temperature, but when the ambient temperature is raised to 150 degrees Fahrenheit, the 50% output, instead, results in a 53% position feedback, the calibrator 129 then adjusts the position feedback to 50%. In other words, in some examples, the calibrator 129 adjusts or offsets the actuator 126 to compensate for the temperature variation, thereby enabling the actuator 126 to operate the process control device 106 within accepted error/tolerance bands.

According to the illustrated example, at block 514, it is determined by the calibrator 129 as to whether the actuator 126 is moving an acceptable amount and/or moving within expected tolerances ranges (e.g., based on adjustments of the set point defined by the loop power control signal 112). In some examples, the calibrator 129 determines that movement of the actuator 126 is within an expected calibration range and/or a position feedback range of the actuator 126. Additionally or alternatively, the calibrator 129 determines whether movement of the actuator 126 is drifting over time (e.g., a gradual shift in the movement of the actuator 126). If the actuator 126 is not moving an acceptable amount and/or moving within the expected tolerance ranges (block 514), control of the process proceeds to block 516. Otherwise, the process proceeds to block 520.

At block 516, if the actuator is not moving an acceptable amount (block 514), an alarm condition is communicated (e.g., transmitted) by the movement analyzer 119 to a respective process control system. Some example errors include, but are not limited to, a deviation (e.g., an error between a received set point and an actual adjusted set point is outside an acceptable error band), a set point being too high (e.g., at or higher than a user-defined setting), a set point being too low (e.g., at or lower than a user-defined setting), a calibration being successful or faulty, etc.

At block 518, in some examples, the process is paused by a defined time interval before movement of the actuator is further adjusted.

At block 520, set point and position feedback data is communicated and/or transmitted to the process control system. In particular, the movement analyzer 119 and/or the calibrator 129 determine and/or calculate a relationship between set points (e.g., adjusted and/or non-adjusted set points) and corresponding position feedback of the actuator 126 (e.g., corresponding actuator positions, corresponding actuator rotational angles, etc.). In this example, the aforementioned relationship is based on high and low position values and offsets calculated therefrom. Accordingly, the determined relationship is transmitted to the process control system.

At block 522 it is determined whether to end the process. If the process is not to end (block 522), control of the process returns to block 502. Otherwise, the process end/returns.

Figure 6:
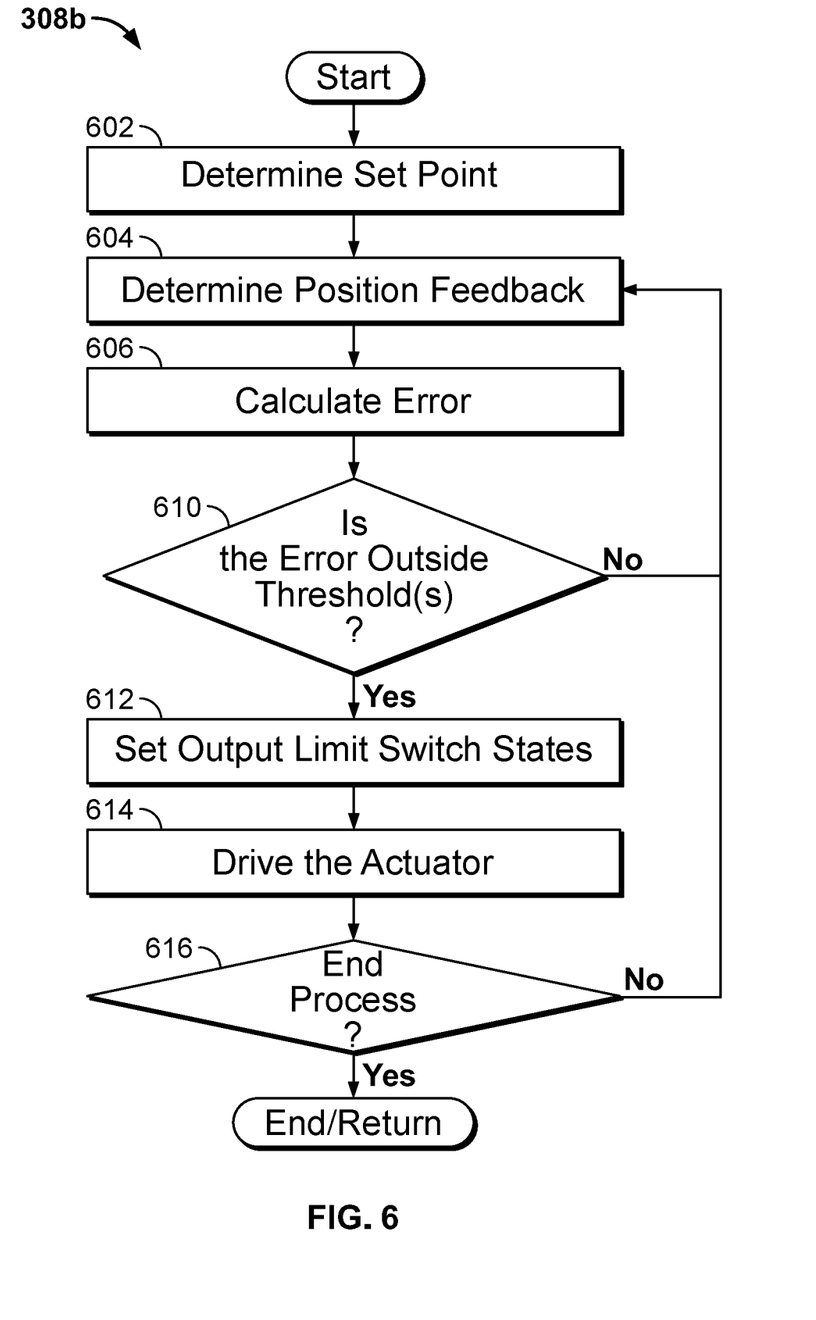
FIG. 6 is a flowchart representative of an alternative example subroutine of the machine readable instructions of FIG. 3.

Turning to FIG. 6, a flowchart representative of an alternative example subroutine 308b is shown. For example, the subroutine 308b may be used to implement the block 308 of FIG. 3.

At block 602, according to the illustrated example, a set point is determined and/or read by the power input 122 from the loop power control signal 112. In some examples, the set point is read from analog input and/or analog signals.

At block 604, the movement analyzer 119 and/or the calibrator 129 read and/or determine position feedback from the actuator 126.

According to the illustrated example, at block 606, the comparator 124 determines and/or calculates an error between the position feedback and the set point.

At block 610, it is then determined by the comparator 124 if the error is outside of allowable threshold(s) and/or tolerance range(s). If the error is not outside the allowable threshold (block 610), control of the process returns to block 604. Otherwise, control of the process proceeds to block 612.

At block 612, in some examples, output limit switch states of the actuator 126 are set by the calibrator 129 based on the error and/or tolerance range(s), for example. In particular, the calibrator 129 adjusts movement of the actuator 126 using the output limit switch states, which define high and low signal values in which the actuator 126 is to be moved. In other words, the output limit switch states define a band/range of input signals where the actuator can remain stationary, for example.

At block 614, the actuator 126 is driven by the movement controller 125. In this example, the actuator 126 is driven using an adjusted set point calculated by the calibrator 129 to shift an error of the actuator 126 toward the allowable thresholds and/or tolerance range(s).

At block 616, it determined whether the process is to end. If the process is not to end (block 616), control of the process returns to block 604. Otherwise, the process ends/returns.

In some examples, a set point dial and indicator is adjusted. In some examples, indicators (e.g., mechanical switches, LEDs, etc.) are implemented to indicate to a user when the error is outside of the allowable thresholds and/or tolerance range(s). For example, a deviation between received and adjusted set points, a set point being too high, or a set point being too low can be indicated.

Figure 7:
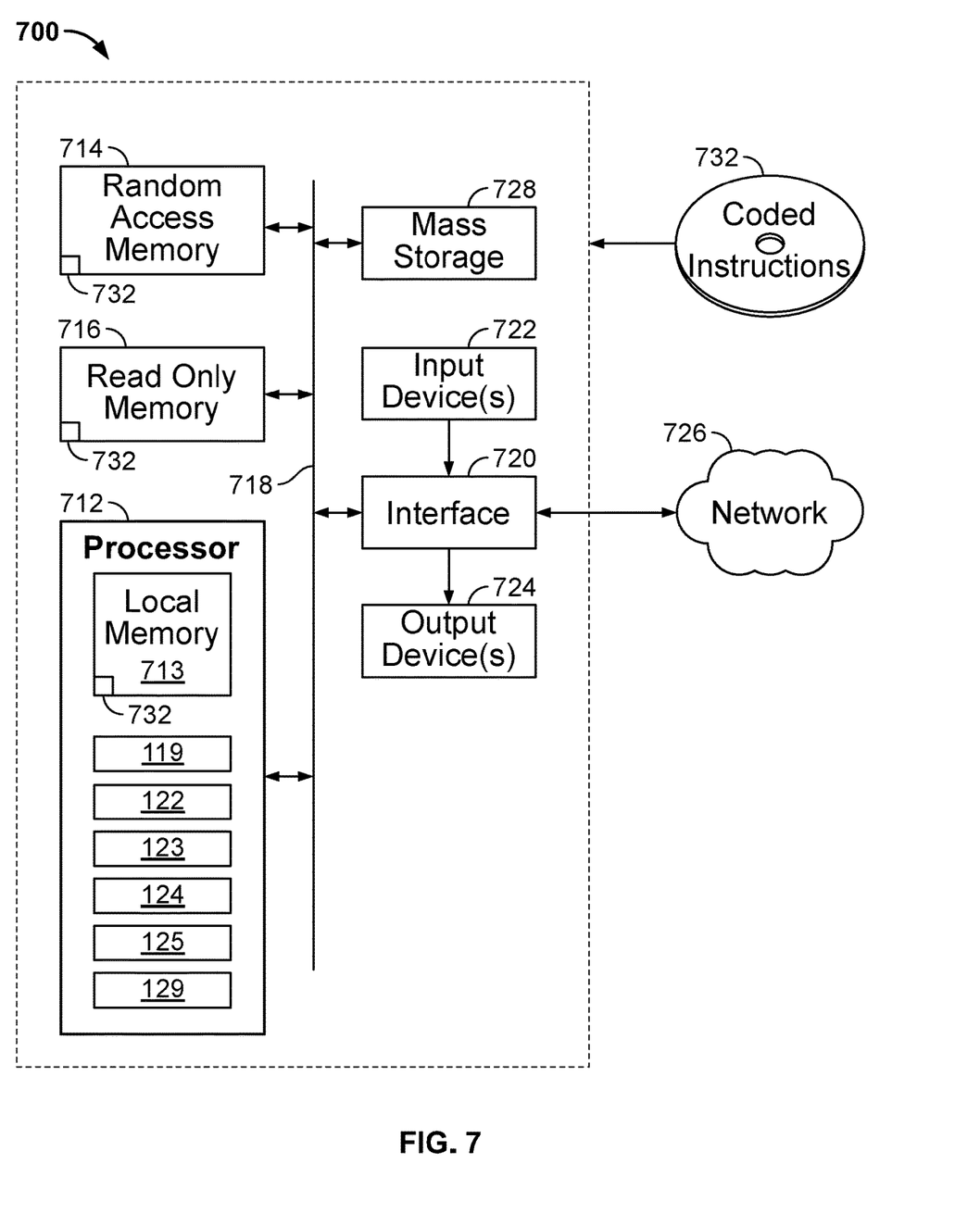
FIG. 7 is a block diagram of an example processing platform structured to execute the instructions of FIGS. 3, 4, 5 and/or 6 to implement the example pneumatic device control system of FIG. 1.

FIG. 7 is a block diagram of an example processor platform 700 structured to execute the instructions of FIGS. 3-6 to implement the pneumatic device control system 100 of FIG. 1. The processor platform 700 can be, for example, a server, a personal computer, a workstation, a self-learning machine (e.g., a neural network), a mobile device (e.g., a cell phone, a smart phone, a tablet such as an iPad), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example movement analyzer 119, the example comparator 124, the example power input 122, the example movement controller 125, the example signal converter 123 and the example calibrator 129.

The processor 712 of the illustrated example includes a local memory 413 (e.g., a cache). The processor 712 of the illustrated example is in communication with a main memory including a volatile memory 714 and a non-volatile memory 716 via a bus 718. The volatile memory 714 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device (s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The machine executable instructions 732 of FIGS. 3-6 may be stored in the mass storage device 728, in the volatile memory 714, in the non-volatile memory 716, and/or on a removable non-transitory computer readable storage medium such as a CD or DVD.

From the foregoing, it will be appreciated that example methods, apparatus and articles of manufacture have been disclosed that enable accurate calibration and/or adjustment of energy-efficient and cost-effective pneumatic process control system devices that are powered via a loop-powered device interface. Examples disclosed herein enable an actuator of the loop-powered device to resist or cease movement (e.g. a fail-safe position, a locked position, etc.) based on a condition in which power (e.g., loop power) is no longer provided. Further, examples disclosed herein do not necessitate relatively high voltage sources, thereby allowing hazard specifications to be more easily met.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An interface for use with a pneumatic process control device of a process control system, the interface comprising:
   a power input to scavenge power from a loop power control signal associated with the process control system;
   a movement controller to cause movement of an actuator powered by the loop power control signal, the actuator operatively coupled to a movable control input associated with the process control device, wherein the movement controller is to cause the actuator to move to a low range position and a high range position; and
   a calibrator to read position feedback of the actuator during the movement to calculate a positional error based on positional measurements associated with the low range position and the high range position, wherein the calibrator is to adjust a set point of the loop power control signal based on the positional error to control the actuator.

2. The interface as defined in claim 1, wherein the calibrator is to store the high range position and the low range position based on verifying that the high range position and the low range position are within acceptable corresponding tolerance ranges.

3. The interface as defined in claim 1, wherein the calibrator is to determine, via a process control sensor, first and second data points associated with the high range position and the low range position, respectively, the calibrator to adjust the set point further based on the first and second data points.

4. The interface as defined in claim 1, wherein the actuator is to prevent movement of the movable control input when the loop power control signal is not provided to the power input.

5. The interface as defined in claim 1, wherein the loop power control signal includes a 4-20 milliamps (mA) signal.

6. The interface as defined in claim 1, further including an energy storage to store electrical energy scavenged from the loop power control signal.

7. A method to calibrate an interface for use with a pneumatic process control device of a process control system, the method comprising:
   scavenging power from a loop power control signal;
   causing an actuator to move to a low range position and a high range position, the actuator operatively coupled to a movable control input associated with the process control device, the actuator powered by the loop power control signal;
   measuring position feedback of the actuator during the movement;
   calculating, via instructions executed by a processor, a positional error of the actuator based on positional measurements associated with the low range position and the high range position; and
   adjusting, via instructions executed by the processor, a set point of the loop power control signal based on the positional error to control the actuator.

8. The method as defined in claim 7, further including storing the high range position and the low range position based on verifying that the high range position and the low range position are within acceptable corresponding tolerance ranges.

9. The method as defined in claim 7, further including determining, via a process control sensor, first and second data points associated with the high and low range positions, respectively, wherein the set point is adjusted further based on the first and second data points.

10. The method as defined in claim 7, further including preventing, via the actuator, movement of the movable control input when the loop power control signal is not provided.

11. The method as defined in claim 7, wherein the loop power includes a 4-20 milliamps (mA) signal.

12. The method as defined in claim 7, further including generating, by executing instructions with the processor, the loop power control signal via harvested radiant light energy.

13. A tangible machine readable medium comprising instructions, which when executed, cause a processor to at least:
   cause a power input to scavenge power from a loop power control signal associated with a process control system;
   cause an actuator to move to a low range position and a high range position, the actuator operatively coupled to a movable control input associated with a pneumatic process control device of the process control system, the actuator powered by the loop power control signal;
   store the high range position and the low range position based on verifying that the high range position and the low range position are within acceptable corresponding tolerance ranges;
   calculate a positional error of the actuator based on positional measurements associated with the low range position and the high range position; and
   adjust a set point of the loop power control signal based on the positional error to control the actuator.

14. A tangible machine readable medium comprising instructions, which when executed, cause a processor to at least:
   cause a power input to scavenge power from a loop power control signal associated with a process control system;
   cause an actuator to move to a low range position and a high range position, the actuator operatively coupled to a movable control input associated with a pneumatic process control device of the process control system, the actuator powered by the loop power control signal;
   calculate a positional error of the actuator based on positional measurements associated with the low range position and the high range position; and
   adjust a set point of the loop power control signal based on the positional error to control the actuator, wherein the set point is further adjusted based on first and second data points associated with the high range position and the low range position, respectively, the first and second data points measured by a process control sensor.

15. The tangible machine readable medium as defined in claim 13, wherein the instructions cause the actuator to prevent movement thereof when the loop power control signal is not provided.

16. The tangible machine readable medium as defined in claim 13, wherein the instructions cause the processor to determine a drift of the actuator over time.

17. The tangible machine readable medium as defined in claim 14, wherein the instructions cause the actuator to prevent movement thereof when the loop power control signal is not provided.

18. The tangible machine readable medium as defined in claim 14, wherein the instructions cause the processor to determine a drift of the actuator over time.

* * * * *